Aug. 3, 1965     P. MALIFAUD     3,199,114
DEVICE FOR ELIMINATING THE GLARE OF AUTOMOBILE HEADLIGHTS
Filed Feb. 18, 1963     2 Sheets-Sheet 1
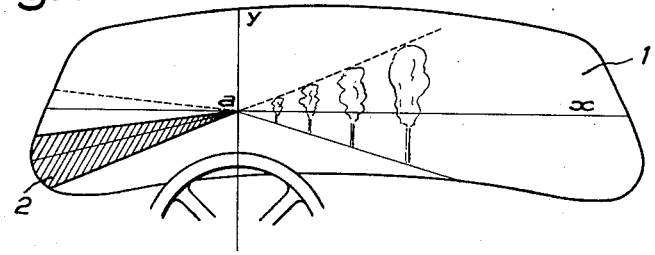
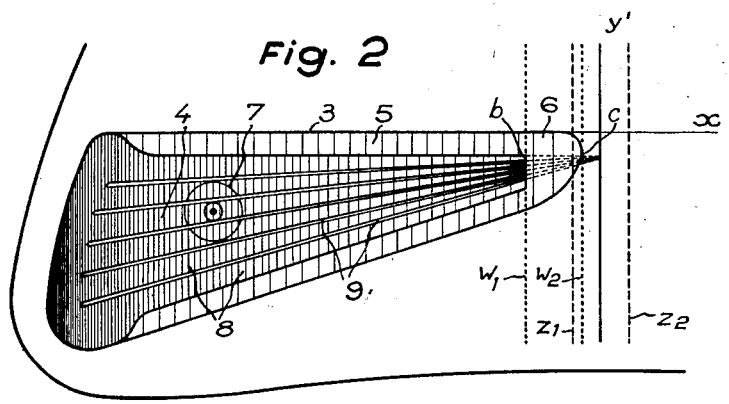
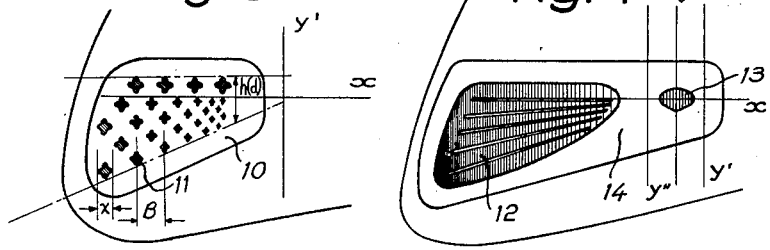
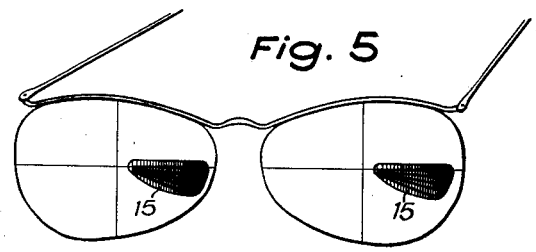
INVENTOR.
PIERRE MALIFAUD
BY *Dennison + Dennison*
ATTORNEYS Aug. 3, 1965  P. MALIFAUD  3,199,114
DEVICE FOR ELIMINATING THE GLARE OF AUTOMOBILE HEADLIGHTS
Filed Feb. 18, 1963  2 Sheets-Sheet 2
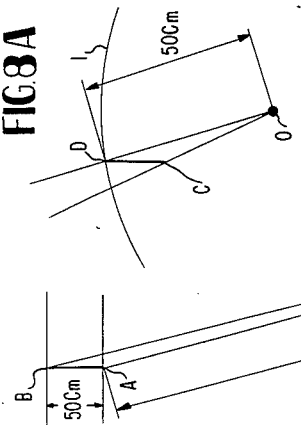
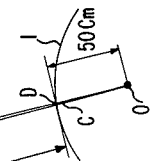
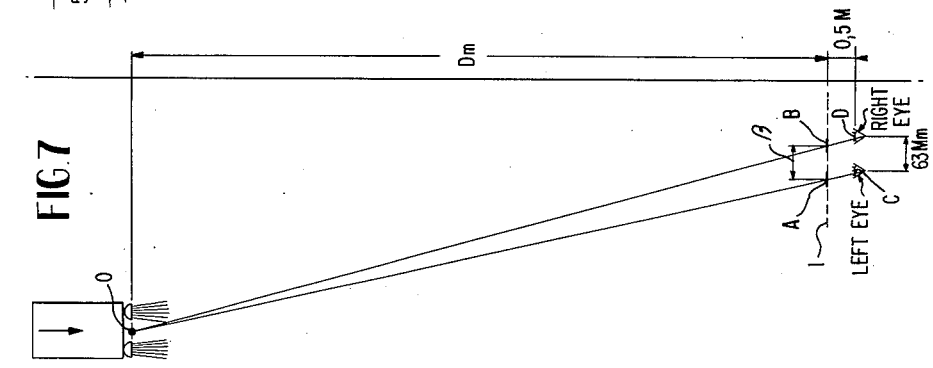
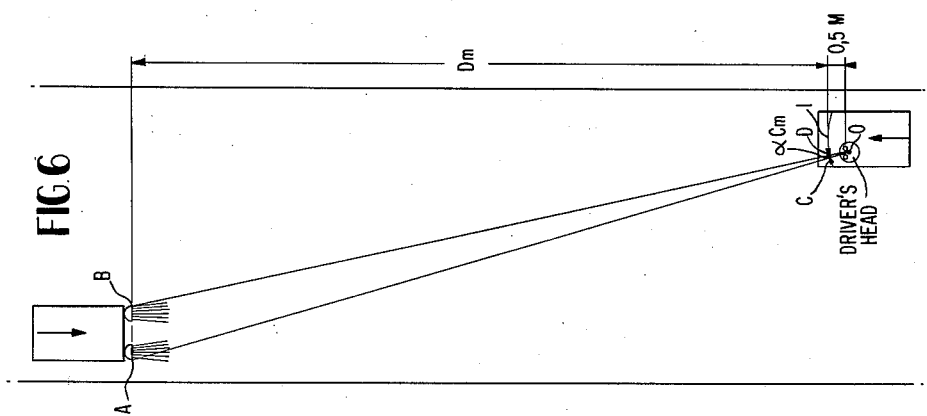
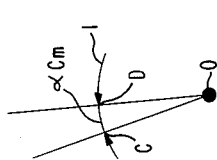
INVENTOR.
PIERRE MALIFAUD
BY
*Dennison + Dennison*
ATTORNEYS

United States Patent Office 3,199,114
Patented Aug. 3, 1965

3,199,114
DEVICE FOR ELIMINATING THE GLARE OF AUTOMOBILE HEADLIGHTS
Pierre Malifaud, 95 Blvd. Jourdan, Paris 14, France
Filed Feb. 18, 1963, Ser. No. 259,129
Claims priority, application France, Feb. 19, 1962, 888,428
6 Claims. (Cl. 351—45)

Glare is not an absolute phenomenon, but is relative to the mean level of illumination or of brightness to which the eye is accustomed under given conditions. Glare is caused by the simultaneous presence in the field of vision of very different brightness levels. The chief consequences of glare are that it creates a haze which is dispersed over the field of vision and which is due to the diffusion of light in the eye, that it produces retinal inhibition and accordingly results in a reflex contraction of the pupil, thereby making the eye incapable of correct vision of even the lowest brightnesses.

Moreover, the appearance of glaring headlights of oncoming automobiles takes place in a region of the visual field which is extremely limited, looking along a line on the left hand side of the road if one is traveling on the right hand side and conversely on the right hand side if one is traveling on the left side. Photographic recordings taken by the present inventor while keeping the lens open in darkness at the level of the driver's eyes have shown that the light produced by oncoming headlamps is localized in a narrow rectilinear band which is slightly inclined and which represents in perspective the path of the said headlamps in the left hand portion of the visual field.

Under these conditions, the remedies against glare can be of two kinds. Either non-dazzling lamps should be compulsorily fitted on automobile vehicles, or else the drivers of such vehicles should be equipped with anti-glare devices.

In this second field of research, it has been vainly endeavored up to the persent time to make use of all kinds of tinted screens in order to reduce the brightness of glaring headlights. The solutions hitherto proposed, however, have proved ineffective. In point of fact, either dark screens have been proposed which reduce the level of illumination of the road to such an excessive extent that it is then no longer possible to see anything which should be seen, with the chief result among others that the driver loses control in locating oncoming vehicles; or alternatively, screens which afford greater transparency have been proposed which have proved unfit for the purpose of carrying out their anti-glare function with any effectiveness. Polarized screens have also been proposed, but the use of such screens would require that cars coming from the opposite direction should be equipped with special headlamps which emit polarized light in a certain plane.

The present invention, which results from an analysis of the problem both from an optical and physiological viewpoint, is intended to contribute a really effective and universal solution to the above-mentioned problem of glare.

To this end, the invention has for its general object a device which is intended to eliminate the glare of automobile headlights, the said device comprising a screen, the generally triangular external configuration of which encloses the locus of the real appearances on the screen of headlights of vehicles approaching from the opposite direction on the road, and being additionally characterized in that the triangular screen is subdivided into unitary triangular zones of dark color having the same apex as the screen, each unitary triangular zone being separated from the other by narrow bands of lighter tint than that of said unitary triangular zones.

The user of a device such as set forth herein derives benefit mainly from two resulting advantages. In the first place, glaring headlights will always be occulted, or cut off from the user's view by one of the unitary triangular zones of dark color; and in the second place, the precise location of the said headlights will always be possible for the user by means of the narrow bands of light tint along which the said headlights will appear to slide as pinpoints along rails.

Further characteristic features and advantages of the present invention will be brought out in the detailed description which is given below by way of example, reference being made therein to the accompanying drawings, in which:

FIG. 1 is a diagrammatic view of an automobile windshield as seen from the interior, and showing the location of headlights approaching from the opposite direction.

FIGS. 2, 3 and 4 are diagrammatic views of three forms of embodiment of masks or screens in accordance with the invention.

FIG. 5 is a diagrammatic view of a pair of eyeglasses constructed in accordance with the invention.

FIGS. 6, 7 and 8 are diagrams showing the derivation of certain equations later described.

FIGS. 6A and 8A are enlarged portions of FIGS. 6 and 8 respectively.

Reference being made to FIG. 1, it will be understood that the driver of a vehicle sees through the windshield 1 the end of the road which is located at the point of intersection $a$ of the horizon line $x$ and the vertical axis $y$, the said point of intersection $a$ thus constituting the vanishing point of his vision. The headlights of oncoming vehicles pass solely over zone 2 of the windshield 1. It is therefore merely necessary to occult the said zone 2 in order to eliminate the glare. If the road were provided with a longitudinal wall in the central portion thereof, the said wall would constantly intercept the light rays which otherwise would dazzle the drivers coming from the opposite direction. It is therefore merely necessary to draw the projection in perspective of the said wall on the windshield, for example, in order to achieve exactly the same effect. The device in accordance with the invention complies primarily with this general prerequisite. Morevoer, due consideration must be given to the fact that glaring headlights are usually joined in pairs, that often a number of cars follow each other, that above all the observer is seeing in binocular vision (the distance between the eyes being on an average 63 mm.) and that finally, the vehicles which are in motion on a road can be subjected to oscillatory movements which are mostly vertical.

Reference being made to FIG. 2, it can be seen that the device in accordance with the invention comprises a screen 3 which is cut out substantially in the triangular shape of zone 2 (as shown in FIG. 1). In order to take into account the various conditions of the experiment and to provide a margin of safety, the screen projects beyond the said zone 2 and assumes the shape of a trapezium. The screen consists of a central tinted portion 4, edge portions 5 affording greater translucence, and a transparent end-portion 6. The screen is fixed on the windshield 1, for example by means of a single suction cup 7 located at the center of gravity thereof and about which the said screen is capable of pivoting with rubbing friction, and can accordingly be orientated at will so as to be placed correctly in position or moved to one side.

The vertical lines $z_1$ and $z_2$ represent by virtue of their spacing of 63 mm., corresponding to the average value of the spacing of human eyes, the position of the ends $b$ and $c$ of the screen as seen by the left eye whereas the lines $w_1$ and $w_2$ represent the position of the end of the screen as seen by the right eye. Accordingly, the end of the screen, while remaining on the left hand side of the line $y'$ which is located in the line of vision of the right eye, serves to mask the horizon only for the left eye, which is an advantage inasmuch as headlights are not usually dazzling when located on the horizon, and a clearer view of the road is thus obtained; however, if it should happen under exceptional conditions that the driver were already dazzled, only a slight movement of the head towards the left would be required in order to cut off distant headlights from view.

The color of the central portion 4 is preferably gradated or shaded so as to be progressively darker from the right hand side to the left hand side, in such manner as to be adapted to the increasing apparent brightness of headlights. As provided by the arrangement in accordance with the invention, this portion of the screen is subdivided into unitary triangular zones 8 which are intended to occult the light of headlights approaching from the opposite direction. The darkness must be fairly intense starting from the position which corresponds to the left-hand line $w_1$ and then progressively increasing toward the left side. In the case in which the screen is of plastic material, for example, the gradations of tone can be obtained by giving the screen and increasing thickness from the right-hand extremity thereof to the left-hand extremity.

In accordance with the arrangement which is contemplated by the present invention, the central portion 4 is also provided with lines 9 of greater translucence which separate the dark triangular zones and are orientated as vanishing-lines in the perspective representation of the road, and which are intended to permit a perfect location of oncoming cars. The said lines 9 are narrow in order not to cause any glare and to make it possible only to see oncoming headlights as if these latter were dimmed. The said headlights then appear to slide as pinpoints along rails as a result of the pattern of translucent lines which follow the vanishing-lines of the road, thereby additionally enabling the user to obtain immediate warning of any sudden and unexpected change of course of any oncoming vehicle. Such a change of course would at once be represented by a transition of light from one translucent line to another as perceptible both reflexly and in peripheral vision, the user's eyes being naturally fixated on the center-line of the road and towards the right hand side thereof. In the case in which the screen is of plastic material, the said translucent lines can be obtained by means of grooves. The color of said lines can also be shaded in the same direction as that of the triangular zones.

The dominant hue of the screen, which is preferably bluish, has two functions: first of all that of reducing the brightness of the headlights by means of its optical density. The spectrum of transmission of light of the screen will in fact be substantially that which, when superimposed on that of the headlights, would produce a resultant light without glaring effect. In practice, the tint chosen will be that which is known by the standard color name of "lunar white." The second function of the screen tint is to produce a coloration of objects (road, curb or roadside etc.) which is favorable to scotopic vision, namely normal night vision. In point of fact, scotopic vision gives rise to the appearance of the "Purkinje phenomenon," or in other words, the eye which is subjected to conditions of darkness is less sensitive to red and more sensitive to blue.

In FIG. 3, the device in accordance with the invention comprises a transparent panel 10 which is fixed on the windshield 1 and which is provided with a plurality of screens or masks such as 11 which are so distributed as to be located inside a zone corresponding to the zone 2, as illustrated in FIG. 1.

The shape, sizes and location of the masks 11 can be extremely varied and can be predetermined by means of the observations recorded in the tables given below. Accordingly, with reference to FIG. 6 and FIG. 6A, by designating as $d$ the distance in meters between the two vehicles which are about to pass each other in opposite directions and by designating as $\alpha$ the apparent distance in centimeters between the two headlights of a vehicle on the windshield, taking into account the fact that the said two headlights have a spacing of 100 centimeters, for example, and that the driver's eyes are located at a distance of 50 centimeters, or .5 meter from the windshield. We can therefore write for the similar triangles OAB and OCD the following relationships:

$$\frac{CD}{AB} = \frac{OD}{OB} = \frac{.5_m}{D_m}$$

This gives the relation:

$$\frac{\alpha_{cm}}{100} = \frac{.5_m}{D_m}$$

Hence:

| Distance $D_m$ in meters | Distance $\alpha$ in centimeters |
|---|---|
| 100 | 0.5 |
| 50 | 1 |
| 25 | 2 |
| 10 | 5 |

The width of the masks 11 must therefore be equal to these values of $\alpha$, or in other words must be progressive from the vanishing-point $a$ up to the left-hand side of the windshield 1. However, it is preferable to give the said masks a slightly greater width in order to ensure greater safety.

The distance between two masks A and B is predetermined as a function of binocular vision, in order that the images of the two masks should always be superimposed when the driver's eyes are focussed at a distance corresponding to infinity. This distance $\beta$ with reference to FIG. 7 can be found by noting that for similar triangles OAB and OCD that the following relationships exist:

$$\frac{AB}{CD} = \frac{OB}{OD} = \frac{D_m}{D_m + .5}$$

Therefore $$\frac{\beta_{mm}}{63_{mm}} = \frac{D_m}{D_m + .5_m}$$

since the spacing of human eyes is, on the average, 63 millimeters.

| $D_m$ in meters | $\beta$ in millimeters |
|---|---|
| 100 | 63 |
| 50 | 62 |
| 25 | 61.7 |
| 10 | 60 |
| 5 | 57 |

The zone 2, which is the projection on the windshield 1 of an imaginary central wall on the road, has a height $h$ which is given by the following equation:

With reference to FIGS. 8 and 8A, let O be the eye of the driver; B the level of the highest headlight; and A the level of the lowest headlight. Therefore, we can write the following equation, considering the two similar triangles OAB and OCD contained in the vertical plane passing by the eye O of the driver and approximating the point between the headlights of the oncoming car:

$$\frac{CD}{AB} = \frac{.5}{D_m + .5}$$

or $$\frac{h_{cm}}{.5} = \frac{.5}{D_m + .5}$$

while taking into account the fact that there is a difference of 50 centimeters between the lowest and highest standard headlamps.

| $D_m$ in meters | $h$ in centimeters |
|---|---|
| 100 | 0.25 |
| 50 | 0.50 |
| 5 | 5 |

Moreover, the arrangement of all these screens which form masks is such that, in accordance with the system which is contemplated by the present invention, the said screens are inscribed in unitary triangular zones having an overall dark tint and separated by narrow translucent bands which are arranged so as to follow the vanishing-lines of the road.

Reference being made to FIG. 4, the device consists of a screen comprising two tinted portions 12 and 13 which are separated by a clear transparent zone 14 located in the line of vision $y''$ of the left eye, the line of vision $y'$ of the right eye being outside the tinted portions which form a light-filter. Between the two lines of vision $y'$ and $y''$ is located the second portion of the screen, the shape given to the said second portion being such as to leave as clear a view of the road as possible. By means of this particular arrangement, the driver obtains an unobstructed view of the horizon with both eyes at the same time. The left hand portion 12 of the screen is provided with the same progressively-shaded triangular zones and the same translucent lines as the screen which has been described with reference to FIG. 2.

In FIG. 5, there have been shown eye-glasses which can be of any ordinary glass and which are each provided with a zone 15 shaped and tinted in accordance with the invention in such a manner that the region of the visual field in which headlights appear is cut off from view, as hereinbefore described, by means of dark-colored zones of triangular configuration, while at the same time permitting the location of headlights proceeding from the opposite direction by means of fine grooves which separate the said triangular zones. It would also be possible to dispense with the glass entirely and to retain only two masks 15 which are mounted on the frame.

What I claim is:

1. A device for eliminating the glare of automobile headlights comprising at least one transparent screen of triangular configuration enclosing the projection in perspective on the surface of said screen, of the locus of the real appearances of headlights of vehicles approaching from the opposite direction on the road, a portion of said screen being subdivided into unitary triangular zones of dark tint which have an elongated shape and a common apex with the screen, each zone being separated from the other by a narrow band of lighter tint than that of said unitary triangular zones.

2. A device as set forth in claim 1, in which the screen is composed of two horizontally spaced shaded parts with a transparent zone provided between said two parts in the line of vision of the left eye of an observer.

3. A device as set forth in claim 1, wherein said triangular zones of dark-tint are progressively shaded with increasing optical density from the apex to the opposite base of the triangle.

4. A device as set forth in claim 3, wherein said screen is formed with gradually increasing thickness from the apex to the opposite base of the triangle to provide said increasing optical density.

5. A device for eliminating the glare of automobile headlights comprising at least one transparent screen of triangular configuration enclosing the projection in perspective on the surface of said screen of the locus of the real appearances of headlights of vehicles approaching from the opposite direction on the road, a portion of said screen being subdivided in to unitary spaced triangular zones having an elongated shape and a common apex with the screen, each of said triangular zones being subdivided into a number of dark-tinted zones vertically separated from each other by translucent zones, said dark zones being adapted to correspond in pairs, the ratio of the distance between the central portions of said dark zones to the normal distance between the eyes of an observer being equal to the quotient of the distance from said zones to the said headlights by said distance from said zones to the headlights plus the distance from the eyes of said observer to said zones in order to achieve binocular occulation.

6. A pair of eye glasses adapted to be worn in front of the eyes of an observer, a glare screen adapted to eliminate the glare of automobile headlights provided in the left-hand portion of each of the eye glass lenses, each glare screen being transparent and of triangular configuration and enclosing the projection in perspective on the surface thereof the locus of the real appearances of headlights of vehicles approaching the observer, a portion of each of said screens being subdivided into unitary triangular zones of dark-tint which have an elongated shape and a common apex with the screen, each zone being separated from the other by a narrow band of lighter tint than that of said unitary triangular zones.

References Cited by the Examiner

UNITED STATES PATENTS

| 2,050,889 | 8/36 | Klise | 296—97 |
| 2,064,746 | 12/36 | Hawk | 296—97 X |
| 2,699,093 | 1/55 | Auwarter | 88—1 X |
| 2,925,302 | 2/60 | Bosch | 296—97 |

FOREIGN PATENTS 497,945  9/54  Italy.

A. HARRY LEVY, *Primary Examiner.*